(12) United States Patent
Miller et al.

(10) Patent No.: US 12,103,209 B2
(45) Date of Patent: Oct. 1, 2024

(54) PROCESS FOR REDUCING GATE BLUSH AND MOLD DESIGN FOR SAME

(71) Applicant: Celanese International Corporation, Irving, TX (US)

(72) Inventors: Kent R Miller, Lexington, KY (US); Michael P. Kowalski, Warren, MI (US); Bruce M. Mulholland, Verona, KY (US)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 0 days.

(21) Appl. No.: 18/497,565

(22) Filed: Oct. 30, 2023

(65) Prior Publication Data

US 2024/0075664 A1   Mar. 7, 2024

Related U.S. Application Data

(62) Division of application No. 16/818,159, filed on Mar. 13, 2020, now Pat. No. 11,801,625.

(60) Provisional application No. 62/818,975, filed on Mar. 15, 2019.

(51) Int. Cl.
| | | |
|---|---|---|
| *B29C 45/00* | (2006.01) |
| *B29C 45/03* | (2006.01) |
| *B29C 45/27* | (2006.01) |
| *B29K 59/00* | (2006.01) |
| *B29K 77/00* | (2006.01) |
| *B29K 105/00* | (2006.01) |
| *B29K 505/02* | (2006.01) |

(52) U.S. Cl.
CPC ...... *B29C 45/0046* (2013.01); *B29C 45/0013* (2013.01); *B29C 45/03* (2013.01); *B29C 45/2708* (2013.01); *B29K 2059/00* (2013.01); *B29K 2077/00* (2013.01); *B29K 2105/0032* (2013.01); *B29K 2505/02* (2013.01)

(58) Field of Classification Search
CPC .. B29C 45/0046; B29C 45/03; B29C 45/2708
See application file for complete search history.

(56) References Cited

U.S. PATENT DOCUMENTS

| | | |
|---|---|---|
| 2,199,144 A | 4/1940 | Tegarty |
| 6,144,505 A | 11/2000 | Nakanishi et al. |

FOREIGN PATENT DOCUMENTS

| | | |
|---|---|---|
| JP | 2009184241 A | 8/2009 |
| JP | 2009285851 A | 12/2009 |

OTHER PUBLICATIONS

European Search Report Corresponding to Application No. 20773010.2 on Oct. 25, 2022.
International Search Report Corresponding to Application No. PCT/US2020/022611 on May 21, 2020.

*Primary Examiner* — James Sanders
(74) *Attorney, Agent, or Firm* — DORITY & MANNING, P.A.

(57) ABSTRACT

A system and process for injection molding polymer articles is described. The system and process are designed to reduce gate blush. In one embodiment, an injection molding device injects a molten polymer composition into a mold cavity adjacent to an interior curved surface on the mold. The flow of the polymer material is parallel to a line that is tangent to the curved surface.

6 Claims, 3 Drawing Sheets

PROCESS FOR REDUCING GATE BLUSH AND MOLD DESIGN FOR SAME

RELATED APPLICATIONS

The present application is a divisional application and is based upon and claims priority to U.S. patent application Ser. No. 16/818,159, having a filing date of Mar. 13, 2020, which is based upon and claims priority to U.S. Provisional Patent Application Ser. No. 62/818,975, having a filing date of Mar. 15, 2019, both of which are incorporated herein by reference.

BACKGROUND

In the relatively recent past, there has been an increasing desire to replace metallic parts with parts made from polymer materials, particularly high performance thermoplastic polymers. The need extends to almost a limitless variety of different applications and fields. For instance, parts made from thermoplastic polymers are used in consumer appliance products, industrial processes, in all sorts of transportation vehicles, and the like. For example, there is an increasing demand to replace metal parts in the automotive field with parts made from thermoplastic polymers. The parts made from the thermoplastic polymers, for instance, may be used on the exterior of the vehicle or on the interior of the vehicle.

When used in automotive applications, for instance, the parts made from thermoplastic polymers typically are required to have an aesthetic appearance in order to further increase the appeal of the vehicle. Thus, in many applications, after being molded, the parts are then painted or otherwise decorated in order to color coordinate with the environment in which they are used. Unfortunately, painting the plastic parts represents a substantial expense in the production of the part. Having to paint the part also increases production time and can significantly add capital expense to the facilities in which the parts are produced.

In view of the above, those skilled in the art have attempted to add coloring agents to thermoplastic polymers in order to forego having to paint the molded parts. In one embodiment, for instance, metallic pigments are added to thermoplastic compounds to provide molded parts having a metallic appearance. During injection molding of polymer articles, however, various surface defects can appear during production of the part. For example, certain part geometries, mold layouts, the location of gates, and molding conditions can cause various drawbacks including increased gloss loss on weathering and visual defects affecting part aesthetics. One particular reoccurring problem is known as "gate blush" which results in irregular dark patterns or a dull or discolored area near the gate location of an injection mold. Another reoccurring problem is the formation of flow lines in the finished part formed at the meeting of two flow fronts when the mold configuration includes more than one gate. These flow lines are sometimes referred to in the art as "knit-lines".

Knit-lines can be eliminated in many applications by having a mold configuration that only includes a single gate or point of entry for the molten thermoplastic material into the mold. Attempts to eliminate gate blush, on the other hand, have generally been unsuccessful in many different molding configurations. U.S. Patent Publication No. 2013/0123424, which is incorporated herein by reference, for instance, discloses a method to reduce gate blush on a molded article by designing an injection mold runner that contains one or more overflow passages. The overflow passages are to divert polymer flow temporarily during injection which has been found to significantly reduce the occurrence of gate blush. Further or alternative configurations for reducing or eliminating gate blush, however, are still desired.

SUMMARY

The present disclosure is generally directed to a molding process and system for injection molding articles that reduces or substantially eliminates gate blush. More particularly, the present disclosure is directed to an injection molding system where gate blush is reduced by designing a gate for the flow of a polymer material that connects with a mold cavity at a point that is tangent to a curved edge of the mold.

In one embodiment, for instance, the present disclosure is directed to a process for molding a polymer material. The process includes feeding a molten polymer material through a gate leading into a mold cavity. The mold cavity includes an interior curved surface. The gate is positioned such that a flow of the molten polymer material exits the gate at a location that is tangent to the interior curved surface. The process further includes the steps of filling the mold cavity with the polymer material to form a molded article and removing the molded article from the mold.

The interior curved surface of the mold cavity, for instance, can follow an arc that extends greater than about 50°, such as greater than about 80°, such as greater than about 90°, such as greater than about 100° and generally less than about 300°. The arc defined by the interior curved surface, for instance, can generally follow a circle, e.g. a circle, ellipse, or oval. The exit of the gate can form an angle with the arc defined by two radii of the circle. The angle can be greater than about 30° and less than about 90°. For instance, the arc can have a first end and a second and opposite end. The angle can be formed on the circle having a vertex at the center of the circle and can extend between the first end on the arc and the point where the flow of polymer material is tangent to the arc. This angle, for instance, can be from about 35° to about 65°, such as from about 40° to about 50°, such as from about 42° to about 48°.

In addition to introducing the flow of polymer into the mold cavity along an interior curved surface, flow of the polymer material can also be spread out in a fan-like shape when exiting the gate. For instance, the fan-like flow shape can have a width that is at least five times greater than a thickness of the polymer flow.

The polymer material deposited into the mold cavity can comprise any suitable thermoplastic polymer. In one embodiment, for instance, the polymer material may comprise a polyoxymethylene polymer or a polyamide polymer. In one embodiment, the thermoplastic polymer can contain a metallic pigment, such as an aluminum pigment. In one embodiment, the metallic particles can have a plate-like shape. The plate-like shaped particles, for instance, can have an aspect ratio of greater than about 4:1, such as greater than about 10:1 and generally less than about 40:1.

The present disclosure is also directed to a system for injection molding a polymer article from a thermoplastic material. The system includes a mold that defines a mold cavity. The mold cavity includes an interior curved surface. The system further includes a compression zone for heating and compressing thermoplastic material and conveying the molten thermoplastic material into at least one flow path that leads to a gate. The gate is positioned so as to exit into the mold cavity. More particularly, the gate is positioned such that flow of a molten polymer material through the gate exits the gate at a location that is tangent to the interior curved surface of the mold cavity. In one embodiment, the gate has a fan-like shape.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
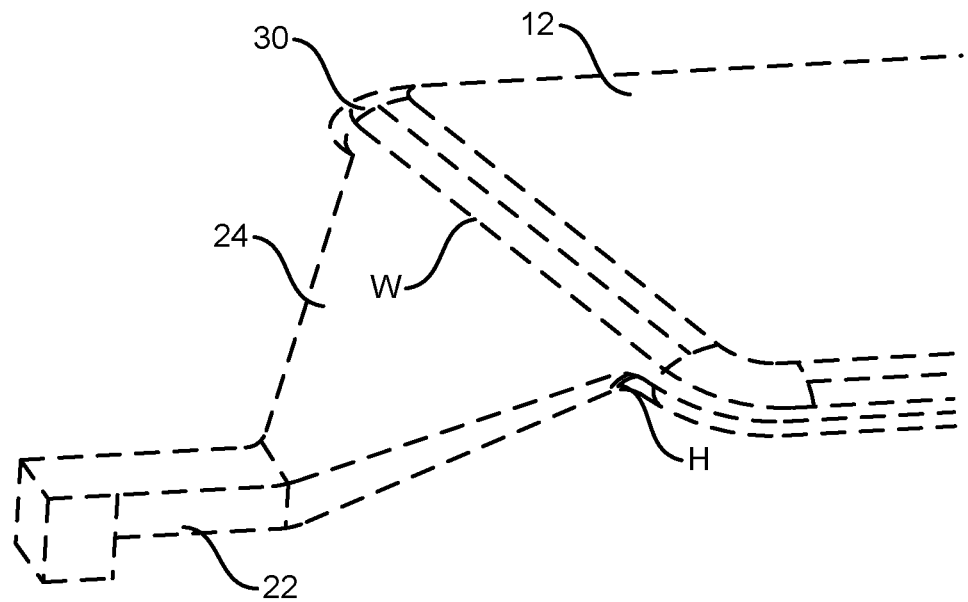
FIG. 1 is a cutaway perspective view of one embodiment of an injection molding configuration in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to a system for producing molded articles and to a process for molding articles while reducing or eliminating gate blush. In general, the system of the present disclosure includes a mold defining a mold cavity in fluid communication with an injection device. The injection device is configured to heat and inject molten thermoplastic materials into the mold. Inbetween the mold and the injection device is a flow path. The flow path ends in a gate that is positioned adjacent to the mold cavity. In accordance with the present disclosure, a molten polymer material exiting the gate enters the mold cavity tangent to a curved portion on the interior surface of the mold.

More particularly, the present disclosure is directed to an injection mold gate that dispenses a molten flow of polymer into a mold cavity along a line that is tangent to a curved surface on the interior of the mold. For example, the flow of polymer can be tangent to a curved surface on the interior of the mold at any point on the curved surface extending from greater than 1° to generally less than about 89°. By having the gate dispense the polymer material into the mold cavity at a point that is generally tangent to a curved surface on the mold cavity, gate blush can be significantly reduced and in many cases eliminated, even when the polymer material contains a metallic pigment or other dispersed pigment.

Gate blush is a surface imperfection that can appear as a discoloration in the gate area of an injection-molded article. The gate area is the portion on the appearance surface of the product formed adjacent to the gate where the thermoplastic polymer is injected into the mold. The gate area, for instance, can be circular and have a diameter of less than about 5 mm$^2$, such as less than about 4 mm$^2$, such as less than about 3 mm$^2$, such as less than about 2 mm$^2$, such as less than about 1 mm$^2$. The center of the gate area is concentric with the position of the gate. As the thermoplastic polymer is injection molded through the gate, gate blush can form and represent a series of curves located in the gate area.

Gate blush can be defined in different ways. In one embodiment, for instance, gate blush comprises a helical pattern of melt fractures that, in one embodiment, are visible to the human eye. In other embodiments, the helical patterns are visible when examined through a scanning electron microscope at ×100 magnification and at an angle of 45°. In one embodiment, at least some of the melt fractures have a length of at least 20 microns, such as at least 20%, such as at least 40%, such as at least 60%.

Gate blush can also be determined through a surface imperfection monitoring technique known as the BORG spectrophotometric technique, which is described in U.S. Pat. No. 6,868,371, which is incorporated herein by reference. In this technique, a spatially resolved spectrophotometer is used to measure surface imperfections in molded plastic parts. The measurements from one or more of these sample plastic parts are then provided to a computerized device, which appropriately filters the data and calculates overall data shape, average peak and valley shift, and a quality number indicative of data slopes. In this method, a sample molded part is mounted on a sample holder that is optionally mounted on motorized translation stages, so as to scan across the feature of interest on the sample surface. A computerized device automates the motion system and data collection, and transforms the raw data into color coordinates. This data is processed by taking into consideration the instrument calibration data obtained beforehand, and allows the user to optimize the signal to noise by allowing adjustment of parameters. The instrument then calculates the difference in the color index between the lightest and darkest points across a streaked region.

Surface imperfections are typically detected by measurement of a reduction in the color index (hereinafter sometimes referred to as "L") which corresponds physically to the imperfection (e.g., the gate blush).

Using the above technique, a color index can be measured at a surface imperfection such as in the gate area of a molded product. The color index can also be measured away from the imperfection. A percent difference in color shift can then be calculated from the two measurements.

In accordance with the present disclosure, minimized surface imperfections results in small differences in the color index measured at the gate area and on the remainder of the appearance surface. For instance, in one embodiment, the color index in the gate area can vary by no more than 20%, such as by no more than 10%, such as no more than 5% in the gate area versus the color index over the remainder of the appearance surface.

One method for using the BORG spectrophotometric technique is described in U.S. Pat. No. 6,825,266, which is also incorporated herein by reference.

Figure 5:
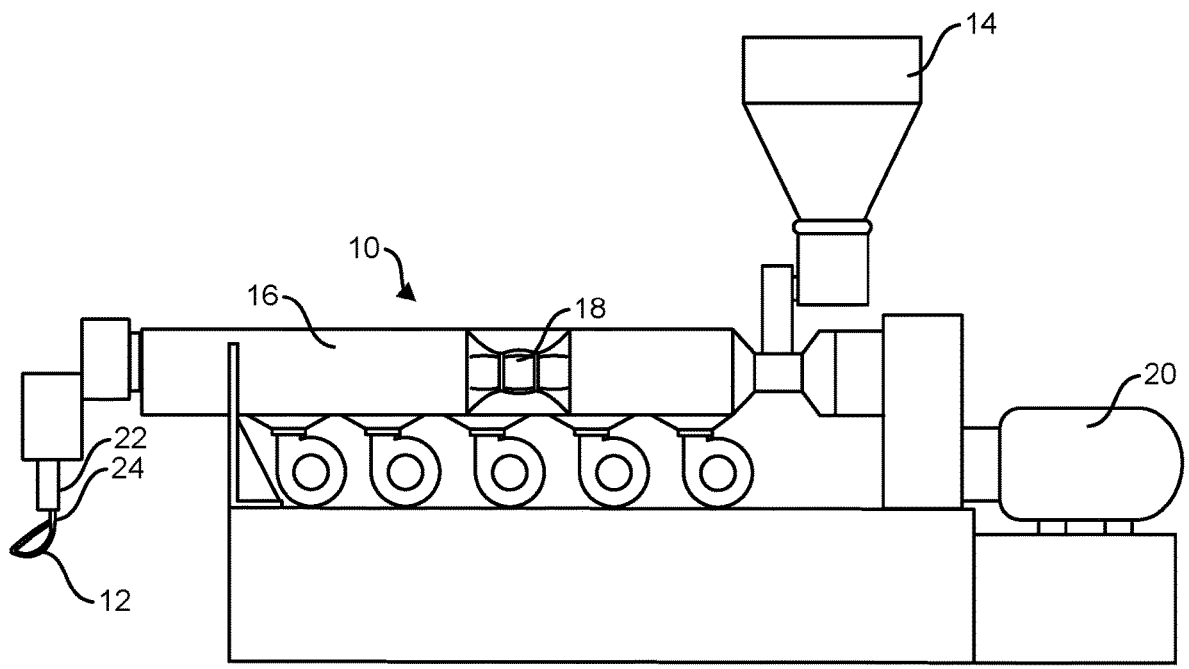
FIG. 5 is a side view with cutaway portions of an injection molding system in accordance with the present disclosure.

Referring to FIG. 5, one embodiment of an injection molding system that may be made in accordance with the present disclosure is shown. As illustrated, the system includes an injection device 10 that is configured to melt or soften a polymer material and to inject the molten polymer material into a mold cavity 12. A polymer composition can be fed to the injection device 10 in any suitable manner. In the embodiment illustrated in FIG. 5, for instance, the system includes a hopper 14 for receiving a polymer composition and supplying the composition to the injection device 10.

The injection device 10 includes a barrel 16 which contains a heater and a conveying device. The conveying device may comprise, for instance, one or more feed screws 18. For instance, in the embodiment illustrated in FIG. 5, the barrel 16 includes a single feed screw 18. In other embodiments, however, the barrel 16 may contain dual feed screws. The feed screw 18 is rotated by a motor 20. The motor 20, for instance, may comprise an electric motor that is connected to the feed screw 18 by one or more belts or chains.

When a polymer composition is added to the hopper 14, the polymer composition is heated within the barrel 16 into a molten state. The feed screw 18 conveys the molten polymer material from the barrel 16 into a flow path 22. The flow path 22 can communicate with the injection device 10 by an injection point. From the flow path 22, the polymer material is injected into a mold cavity of the mold 12 via a gate 24 for producing molded articles.

In the past, problems were experienced at the point of entry of the polymer material into the mold cavity. In particular, visual defects formed where the polymer material entered the mold cavity. These defects are referred to as gate blush. In many instances, the gate blush can appear as an irregular dark pattern or as a web-like imperfection that substantially decreases the aesthetic appeal of the part and can lead to the part being rejected by manufacturers.

Referring to FIGS. 1-4, one embodiment of a mold configuration in accordance with the present disclosure for reducing or eliminating gate blush is shown. Referring to FIG. 1, for instance, a flow path 22 is shown that is designed to receive the flow of a molten polymer material from an injection molding system such as the one illustrated in FIG. 5. The flow path 22 is in fluid communication with a gate 24. The gate 24 directs the flow of the molten polymer material into the cavity of a mold 12.

As shown in FIG. 1, the mold 12 includes a curved portion 30 that defines an interior curved surface within the mold cavity. In accordance with the present disclosure, the gate 24 is positioned such that a flow of the molten polymer material exits the gate at a location that is tangent to the interior curved surface defined by the curved portion 30.

Figure 2:
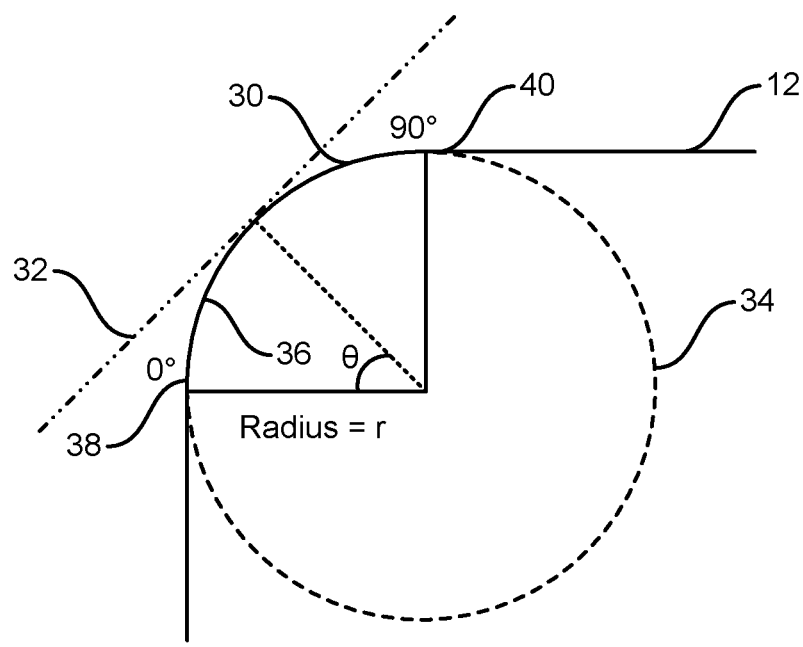
FIG. 2 is a geometric diagram illustrating the relationship between flow of a polymer and a curved surface on a mold in accordance with the present disclosure.

Referring to FIG. 2, a diagram is presented that illustrates the relationship between the curved portion 30 on the mold 12 and the direction of flow of the polymer material. As shown, the curved portion 30 includes an interior curved surface that generally follows the circumference of a circle 34. It should be understood that the interior curved surface of the mold does not necessarily have to have a perfectly circular shape. FIG. 2 is provided for purposes of explanation only.

A line 32 is illustrated in FIG. 2 that is tangent to the curved portion 30. In accordance with the present disclosure, the gate 24 dispenses the molten polymer material in a direction that is parallel with the line 32 on the interior of the mold 12. In general, the molten polymer material can flow into the mold cavity at any point on the curved portion 30 that is tangent to the curved portion. For example, as shown in FIG. 2, the curved portion 30 defines an arc 36. The arc has a first end 38 and a second end 40. In the embodiment illustrated in FIG. 2, the arc 36 defined by the curved portion 30 extends 90° on the circumference of the circle 34. In general, the arc defined by the curved portion 30 can extend at least 50°, such as at least 60°, such as at least 70°, such as at least 80°, such as at least 90°, such as at least 100°, such as at least 110°, such as at least 120°, such as at least 130°, such as at least 140°, such as at least 150°, such as at least 160°, such as at least 170°, such as at least 180°, such as at least 190°, such as at least 200° and generally less than about 330°, such as less than about 300°, such as less than about 250°.

As shown in FIG. 2, the point at which the line 32 or the polymer flow is tangent to the arc 36 can be defined by an angle θ. The angle θ is defined by two radii of the circle 34. One side of the angle extends from the center of the circle 34 to the first end of the arc 36. The second side of the angle extends from the center of the circle 34 to the point at which the line 32 is tangent to the arc 36. In accordance with the present disclosure, the angle θ can be adjusted as needed for reducing or eliminating gate blush. In general, the angle θ is greater than about 1° and less than about 89°. The angle θ for any particular mold configuration may depend upon various factors including the size of the mold cavity, the polymer material flowing into the mold, the size of the arc 36 defined by the interior curved surface 30, the flow rate of the polymer material, and various other factors. In one embodiment, the flow of the polymer material enters the mold cavity at a point tangent to the arc 36 such that the resulting angle θ is greater than about 10°, such as greater than about 20°, such as greater than about 30°, such as greater than about 40°. The angle θ is generally less than about 80°, such as less than about 70°, such as less than about 60°, such as less than about 50°. In one embodiment, the angle θ is from about 35° to about 65°, such as from about 40° to about 50°, such as from about 42° to about 48°. In the embodiment illustrated in FIG. 2, for instance, the angle θ is 45°.

Figure 3:
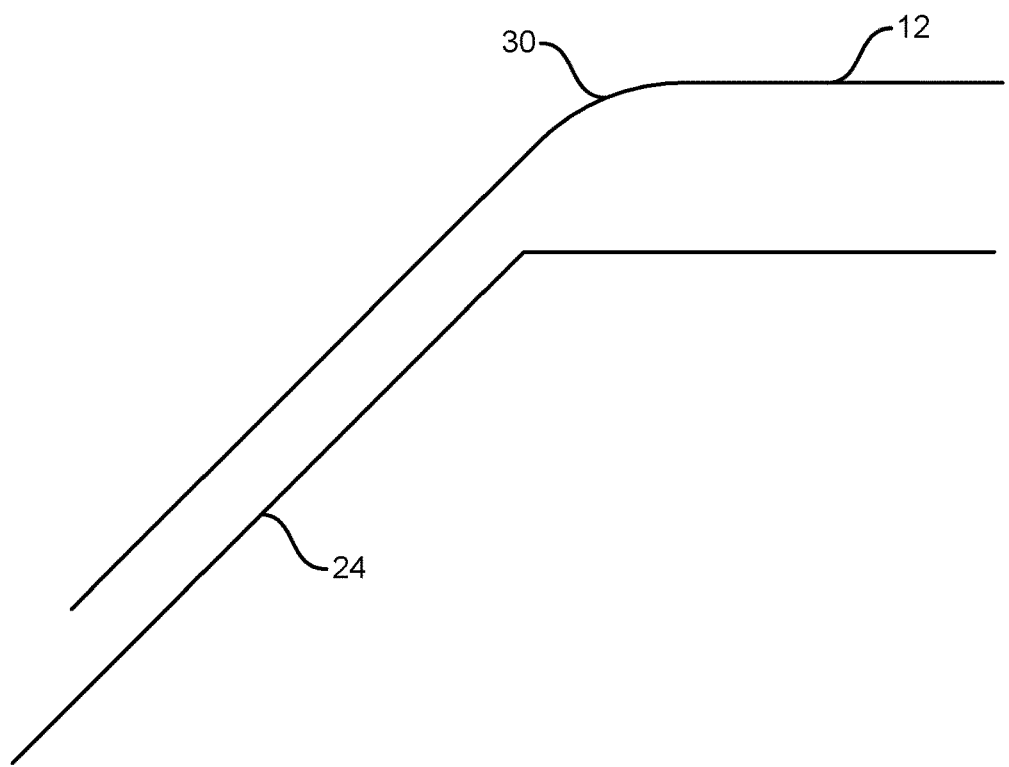
FIG. 3 is a cross-section of the molding configuration illustrated in FIG. 1.
Figure 4:
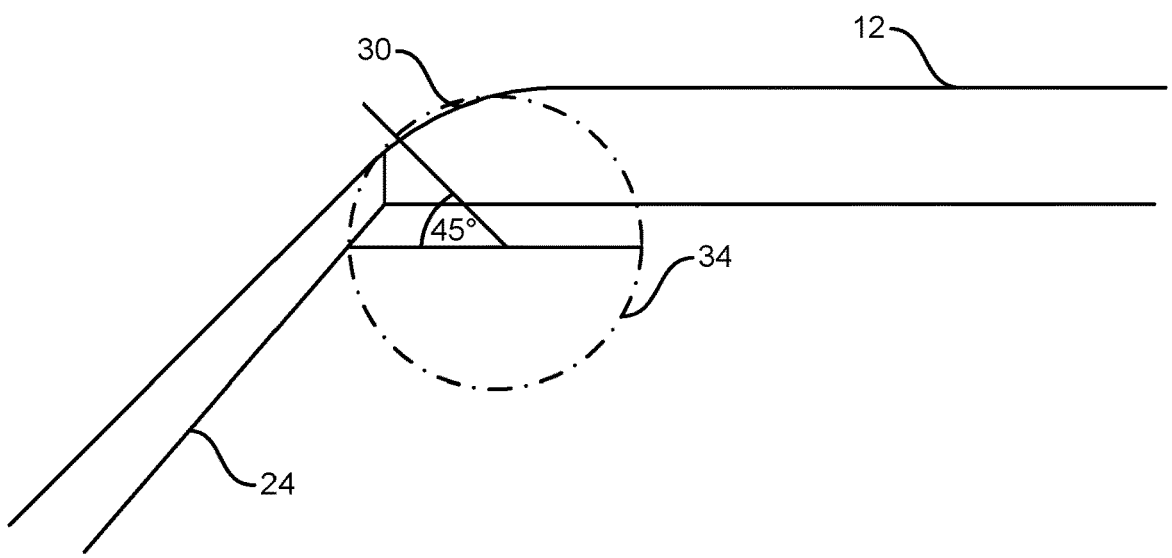
FIG. 4 is a further cross-section of the molding configuration illustrated in FIG. 1.

Referring to FIGS. 3 and 4, a cross-sectional view of the mold configuration illustrated in FIG. 1 is shown. The mold 12 is in fluid communication with the gate 24. The mold 12 includes the curved portion 30 that defines an interior curved surface. The gate 24 directs the flow of a molten polymer material such that the polymer material enters the mold cavity of the mold 12 at a point tangent to the interior curved surface defined by the curved portion 30. As shown in FIG. 4, a circle 34 can be drawn that best follows the interior curved surface of the curved portion 30. The flow of polymer material enters the mold cavity at a point that is tangent to the interior curved surface. The point that is tangent on the interior curved surface forms an angle θ on the circle 34. This angle can be anywhere from greater than 1° to less than 89°, such as greater than about 30° to less than about 60°.

In one embodiment, the mold 12 includes only a single gate 24. As shown in FIG. 1, in one embodiment, the gate 24 can have a fan-like shape. As the molten polymer material flows into the gate 24 from the flow path 22, for instance, the molten polymer material is spread out as it enters the mold cavity of the mold 12. The fan-like shape of the gate 24, for instance, can have a width W that is much greater than the height H. The width W, for instance, can be at least 3 times greater, such as at least 5 times greater, such as at least 7 times greater, such as at least 9 times greater than the height H. The width W is generally less than about 50 times greater than the height H.

As also shown in FIG. 1, the gate 24 can generally have a gradually decreasing height H from the flow path 22 to the exit of the gate at the entrance to the mold 12. The gradually decreasing height is also shown in FIG. 4.

In general, the system and process of the present disclosure are adaptable to processing any suitable thermoplastic polymer in a molding process, particularly in an injection molding process. In one embodiment, the polymer composition used in the process of the present disclosure includes a thermoplastic polymer combined with a coloring agent for producing molded articles that are ready for use upon exiting the mold cavity. In particular, the coloring agent is present in order to provide a molded article having aesthetic appeal and to forego the necessity of having to paint the molded article or otherwise decorate the molded article.

Thermoplastic polymers that may be processed according to the present disclosure include polyacetal polymers, polyamide polymers, polyarylene sulfide polymers such as polyphenylene sulfide polymers, polyolefin polymers including polyethylenes and polypropylenes, polycarbonate polymers, polyester polymers including PCT polymers, and the like.

The coloring agent combined with the thermoplastic polymer may comprise a pigment, a dye, metallic particles, and the like. Pigment particles can include, for instance, barium sulfate particles, titanium dioxide particles, calcium carbonate particles, and the like. In another embodiment, the coloring agent may comprise mica flakes alone or in combination with dyes, such as organic dyes.

In one particular embodiment, the polymer composition comprises a polyoxymethylene or polyamide resin combined with a coloring agent, particularly metal flakes. The polymer resin may comprise a homopolymer or a copolymer and can include end caps. The polyoxymethylene homopolymers may be obtained by polymerizing formaldehyde or trioxane, which can be initiated cationically or anionically. The homopolymers can contain primarily oxymethylene units in the polymer chain. Polyoxymethylene copolymers, on the other hand, may contain oxyalkylene units along side oxymethylene units. The oxyalkylene units may contain, for instance, from about 2 to about 8 carbon units and may be linear or branched. In one embodiment, the homopolymer or copolymer can have hydroxy end groups that have been chemically stabilized to resist degradation by esterification or by etherification.

Polyoxymethylene copolymers can contain alongside the —CH$_2$O— repeat units, up to 50 mol %, such as from 0.1 to 20 mol %, and in particular from 0.5 to 10 mol %, of repeat units of the following formula

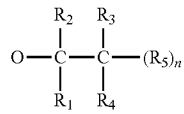

where $R^1$ to $R^4$, independently of one another, are a hydrogen atom, a $C_1$-$C_4$-alkyl group, or a halo-substituted alkyl group having from 1 to 4 carbon atoms, and $R^5$ is —CH$_2$—, —O—CH$_2$—, or a $C_1$-$C_4$-alkyl- or $C_1$-$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

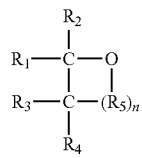

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

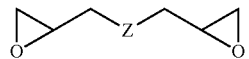

where Z is a chemical bond, —O— or —ORO— (R=$C_1$-$C_8$-alkylene or $C_2$-$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Polyacetal resins as defined herein can also include end capped resins. Such resins, for instance, can have pendant hydroxyl groups. Such polymers are described, for instance, in U.S. Pat. No. 5,043,398, which is incorporated herein by reference.

In one embodiment, the polyacetal polymer may contain hemiformal terminal groups and/or formyl terminal groups. In particular, it is believed that the methods of the present disclosure can advantageously significantly reduce formaldehyde emissions of polyacetal polymers, even when the polymers contain hemiformal terminal groups and possibly formyl terminal groups. For instance, in one embodiment, the polyacetal polymer may contain hemiformal terminal groups in amounts greater than 1.0 mmol/kg, such as in amounts greater than 1.5 mmol/kg. In an alternative embodiment, the polyacetal polymer may contain formyl terminal groups in amounts greater than 2 mmol/kg, such as in amounts greater than 2.5 mmol/kg.

The processes used to form the polyoxymethylene polymers as described above can vary depending upon the particular application. A process, however, can be used which results in a polyacetal resin having a relatively low formaldehyde content. In this regard, in one embodiment, the polymer can be made via a solution hydrolysis process as may be described in U.S. Patent Application Publication Number 2007/0027300 and/or in United States Patent Application Number 2008/0242800, which are both incorporated herein by reference. For instance, in one embodiment, a polyoxymethylene polymer containing aliphatic or cycloaliphatic diol units can be degraded via solution hydrolysis by using methanol and water with triolethylene.

Polyacetal resins or polyoxymethylenes that may be used in accordance with the present disclosure generally have a melting point of greater than about 150 degrees C. The molecular weight of the polymer can generally range from about 2,000 to about 1,000,000, such as from about 7,000 to about 150,000. The polymer can have a meltflow rate (MVR 190-2.16) from about 0.3 to about 20 g/10 min, and particularly from about 2 to about 9 g/10 min (ISO 1133).

Various different types of polyamide polymers may also be used to produce the molded articles. The polyamide polymer, for instance, may be an aliphatic polyamide, such as nylon 6 or nylon 66.

In general, the polymer composition can contain a thermoplastic polymer resin in an amount greater than about 60% by weight, such as in an amount greater than about 70% by weight, such as in an amount greater than about 80% by weight, such as in an amount greater than about 90% by weight. The polymer is generally present in an amount less than about 95% by weight.

As described above, the polymer resin may be combined with a metallic pigment, such as metal flakes. The metal flakes can have a plate-like shape. The particles can be polished or otherwise have a high reflectivity. In one embodiment, the plate-like particles can have an aspect ratio of greater than about 4:1, such as greater than about 8:1, such as from about 10:1 to about 50:1.

The plate-like particles can have a median diameter of greater than about 12 microns, such as greater than about 14 microns. For instance, the plate-like particles can have a median diameter of from about 15 microns to about 650 microns. In one particular embodiment, the plate-like particles have a size of from about 15 microns to about 30 microns.

The metallic pigment may be present in the polymer composition in an amount from about 0.01% to about 20% by weight, such as from about 0.1% to about 15% by weight. For example, the metallic pigment may be present in the polymer composition in an amount from about 0.25% to about 10% by weight, such as from about 0.5% to about 5% by weight.

The metallic pigment may comprise any suitable metal, such as metals of Group I-B, Ill-A, IV, VI-B, and VIII of the Periodic Table. Physical mixtures of these metallic pigments and alloys of these pigments may also be employed. In particular examples, the metallic pigment may include aluminum, bronze, brass, chromium, copper, gold, iron, molybdenum, nickel, tin, titanium, zinc and the like. In one embodiment, two metallic pigments may be combined that have different average particle sizes.

In one embodiment, the metallic pigment may comprise an aluminum pigment that contains elemental aluminum. The aluminum pigment, for instance, can be very thin having a thickness of less than about 1 micron and can have a median diameter as described above. In one particular embodiment, for instance, the aluminum pigment may have a median diameter of from about 12 microns to about 18 microns. The aluminum pigment can have a pronounced flop, a high brilliance and be highly reflective.

In one embodiment, the aluminum pigment can contain greater than about 80% by weight aluminum. The aluminum pigment can be present alone or in combination with other additives, such as a carrier. For instance, the aluminum pigment may be present in combination with a thermoplastic polymer, such as a polyolefin, a purified medical white oil, or may be present with a solvent, such as di-isononyl-phtalate.

In addition to a coloring agent and a thermoplastic polymer, the polymer composition may also contain various other components. For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, or mixtures thereof.

In one embodiment, the polymer composition may also include a formaldehyde scavenger, such as a nitrogen-containing compound. The nitrogen scavenger, for instance, may comprise a guanamine compound, such as benzoguanamine.

In one embodiment, the composition may contain a nucleant. The nucleant, for instance, may increase crystallinity and may comprise an oxymethylene terpolymer. In one particular embodiment, for instance, the nucleant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be included in amounts greater than about 0.1% by weight, such as in amounts greater than about 0.5% by weight, but in an amount less than about 2% by weight, such as in an amount less than about 1% by weight.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm. The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

In one embodiment, the composition may also contain one or more lubricants. The lubricant may comprise a polymer wax composition. Lubricants that may be included in the composition include, for instance, N,N'-ethylene bisstearamide. In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount of from about 0.01% to about 1% by weight.

Any of the above additives can be added to the polymer composition alone or combined with other additives. In general, each additive is present in an amount less than about 5% by weight, such as in an amount less than about 2% by weight, such as in an amount less than about 1% by weight.

An almost limitless variety of polymer articles may be molded in accordance with the present disclosure. Such articles may include knobs, door handles, automotive panels, interior automotive parts such as bezels, consumer appliance parts, and the like without limitation.

The present disclosure may be better understood with reference to the following example.

EXAMPLE

The following example was conducted in order to demonstrate some of the benefits and advantages of the present disclosure.

A polyoxymethylene polymer was blended with an aluminum pigment and fed through a single screw extruder followed by injection molding into a plaque using different gate geometries. The first tested gate geometry was similar to the gate geometry illustrated in FIG. 3, where the polymer flow was fed into the mold parallel with a line that is tangent to a curved surface on the mold. A second gate geometry was tested in which the gate dispensed the polymer into the mold where the polymer flow was not tangent to a curved surface on the mold. In particular, the gate was moved to a horizontal position with respect to the mold interior surface (0° as shown in FIG. 4). In the first tested gate geometry, the angle of gate entrance to the mold was 45°. The mold machine and injection molding parameters were kept constant for both gate configurations.

After molding, the plaques were visually inspected. The plaque made according to the present disclosure had no visible gate blush. The comparative sample, however, had gate blush issues covering over half of the surface of the plaque.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A system for injection molding a polymer article from a thermoplastic material comprising:
    a mold defining a mold cavity, the mold cavity including an interior curved surface;
    a compression zone for heating and compressing a thermoplastic material;
    a flow path in fluid communication with the compression zone for receiving a flow of a molten polymer material; and
    a gate in fluid communication with the polymer flow path, the gate including an exit that leads into the mold cavity, the gate being positioned such that a flow of molten polymer material exits the gate at a location that is tangent to the interior curved surface of the mold cavity; wherein an arc defined by the interior curved surface follows a circle, and wherein the exit of the gate forms an angle with the arc defined by two radii of the circle, the angle being greater than 30° and less than 90°; and the gate has a fan shape, the gate including a width and a height and wherein the width is at least four times greater than the height at the exit of the gate.

2. A system as defined in claim 1, wherein the interior curved surface follows an arc that extends greater than 50°.

3. A system as defined in claim 2, wherein the arc extends greater than about 80° and less than about 300° and generally less than about 300°.

4. A system as defined in claim 1, wherein the arc defines a first end and a second and opposite end and wherein the angle is formed on the circle between the first end of the arc and the point where the flow of polymer material is tangent to the arc.

5. A system as defined in claim 1, wherein the angle is from about 35° to about 65°.

6. A system as defined in claim 1, wherein an angle formed between two radii of the circle that extend from a center of the circle to the first end of the arc and a center of the circle to the second end of the arc has an angle of greater than about 70° and less than about 300° and generally less than about 300°.

* * * * *